United States Patent [19]

Schock

[11] Patent Number: 5,685,375

[45] Date of Patent: Nov. 11, 1997

[54] FARRIER'S TOOL

[76] Inventor: Donald E. Schock, R.D. 1, Box 513A, Red Lion, Pa. 17356

[21] Appl. No.: 524,431

[22] Filed: Sep. 6, 1995

[51] Int. Cl.$^6$ ...................................... A01L 11/00
[52] U.S. Cl. ................................. 168/48.2; 15/106
[58] Field of Search ..................... 168/48.1, 48.2; 30/164.95; 15/105.53, 113, 111, 106; 7/158, 159, 160, 162

[56] References Cited

U.S. PATENT DOCUMENTS

| 812,740 | 2/1906 | Harris et al. | |
| 937,383 | 10/1909 | Olds . | |
| 1,487,226 | 3/1924 | Frahm | 30/355 X |
| 1,517,717 | 12/1924 | Ekman | 7/158 X |
| 1,563,716 | 12/1925 | Briggs | 7/105 X |
| 1,693,745 | 12/1928 | Connor | 15/105 |
| 2,607,507 | 8/1952 | Smith | 15/111 |
| 2,857,608 | 10/1958 | Schwartz | 15/111 |
| 3,047,896 | 8/1962 | Gunderson | 15/111 |
| 4,146,943 | 4/1979 | Wertheimer et al. | 15/111 |
| 4,367,798 | 1/1983 | Sabol | 168/45 |

FOREIGN PATENT DOCUMENTS 2923484  12/1980  Germany.

Primary Examiner—Robert P. Swiatek
Attorney, Agent, or Firm—Birch, Stewart, Kolasch & Birch, LLP

[57] ABSTRACT

A tool having both a brush and a rotary blade is used for cleaning the crease of a horse shoe. The rotary blade is run over a debris-filled crease in order to loosen and remove the debris. The loosened debris is then removed with the brush. The crease is thus cleaned with less effort and with less brush wear.

15 Claims, 2 Drawing Sheets

FARRIER'S TOOL

FIELD OF THE INVENTION

The present invention relates to a tool for cleaning the crease portion of a horseshoe.

BACKGROUND OF THE INVENTION

When a horse is shod, it is common practice to first remove the horseshoes, trim the hoof and then nail the old shoes onto the hoof. The nails used to attach the shoe pass through pre-formed nail holes which are provided in a crease running through the central portion of the bottom of the horseshoe. The heads of the nails are thus seated somewhat into the crease. However, when the old shoes are to be put back onto the hoofs, this crease portion of the horseshoe must be cleaned to remove debris that has accumulated since the last shoeing. This debris, which generally comprises dirt or clay, is picked up from the ground and forced upwardly into the crease of the shoe by the weight of the horse.

Presently, a farrier or blacksmith, will clean the crease by brushing it with a stiff wire brush and/or by banging on the shoe in an effort to loosen and shake out the packed debris. Although the debris is removed by these methods, they are time consuming and somewhat strenuous. Moreover, the metal wire brushes typically employed by a farrier are prone to wearing out.

SUMMARY OF THE INVENTION

Accordingly, an object of the present invention is to provide a tool for easily and efficiently cleaning the crease of a horseshoe.

Another object of the invention is to provide a tool that will have a long useful lifetime.

A further object of the present invention is a process for cleaning the crease of a horseshoe.

These and other objects of the present invention are accomplished by a farrier's tool, comprising a handle, a brush portion disposed on said handle and comprised of metal bristles, and a rotary blade disposed on said handle that is adapted to fit into the crease on the bottom of a horseshoe. These objects are also accomplished by a farrier's tool comprising a handle, a brush portion disposed on the handle and a rotary blade disposed on the handle which is adapted to fit into the crease on the bottom of a horseshoe and having a wavy edge. The tool of the present invention can carry out the inventive method for cleaning a crease of a horseshoe, which comprises rolling a rotary blade over a debris-containing crease portion of a horseshoe, and brushing the crease portion to thereby remove the debris.

DETAILED DESCRIPTION OF THE INVENTION

Figure 1:
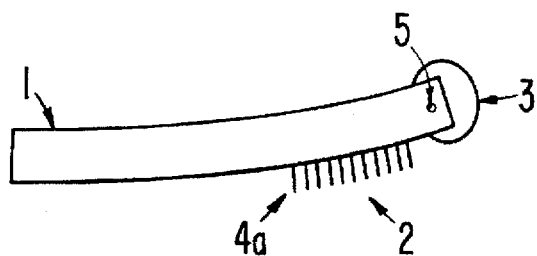
FIG. 1 shows a side view of a farrier's tool.
Figure 2:
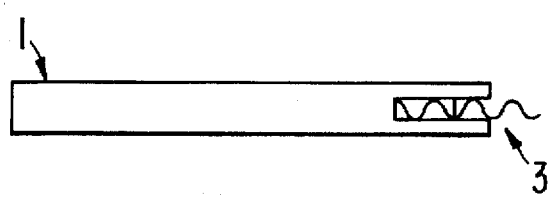
FIG. 2 shows a top view of a farrier's tool.
Figure 3:
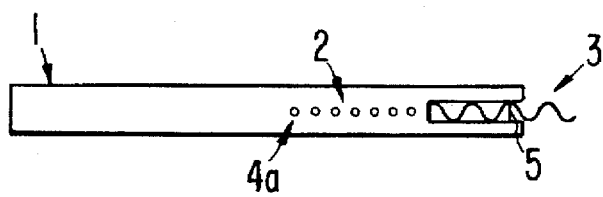
FIG. 3 shows a bottom view of a farrier's tool.

As illustrated in FIGS. 1–3, the present invention comprises a handle 1 having a brush portion 2 and a rotary blade 3. The handle 1 is adapted so as to be held by a human hand, preferably so as to be easily held by a single hand. The handle can be made of any convenient material, including wood, metal or plastic. Preferably the handle 1 has a curve, as is illustrated in FIG. 1, so that greater leverage can be applied by the farrier in using the brush and rotary blade.

The brush portion 2 is disposed on the handle 1 by using any conventional means. The bristles that comprise the brush can be of any conventional or suitable material so long as they provide sufficient scrubbing and cleaning action. Preferably the brush portion is made of metal bristles; particularly steel wire bristles.

The brush portion 2 is generally comprised of a series of individual bristle collections such as 4a. These bristle collections can be disposed in one or more rows. Further, when multiple rows of bristle collections are used, the bristle collections in each row may be laterally offset from the bristle collections in the adjacent row. Generally, two to six rows are employed, although FIG. 3 depicts only one row for simplicity.

Figure 5A:
FIG. 5A AND B shows an end view of a preferred brush portion arrangement.
Figure 5B:
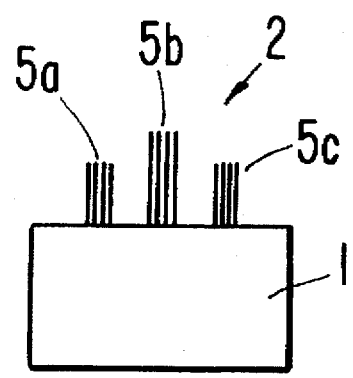

In one embodiment, the bristles collections in the middle row, or rows, of the bristle collections are taller than the bristles in the outer rows. This is illustrated in FIG. 5, where the brush portion 2 is attached to the handle 1. The center bristle collections 5b are taller then side bristle collections 5a and 5c.

The brush portion generally extends longitudinally along a major face of the handle. The length of this brush portion is usually about ¼ to ¾ the overall length of the major face.

The rotary blade 3 is disposed on the handle 1 by any conventional attachment means and at any convenient location. FIGS. 1–3 illustrate a preferred attachment means wherein the rotary blade is rotatable above an axis disposed in the end of the handle. Pin 5 extends through the central axis of the rotary blade and into the handle. A recess is formed in the end of the handle so as to receive a portion of the rotary blade.

Other alternative ways for disposing the rotary blade on the handle include holding the rotary blade completely exterior to the handle by means of extending brackets (not shown) which are fixed at one end thereof to the handle and at the other end to the central axis pin of the rotary blade.

The rotary blade is preferably circular in profile, although oval and other profiles are acceptable. The circular profile of the rotary blade typically has a diameter of one to four inches, and preferably about two inches. The rotary blade is relatively thin in the thickness direction and generally has a thickness of from 1/128 to ⅛ of an inch. Further, the edge of the rotary blade may be sharpened to be even thinner.

Although the outer edge of the rotary blade can be straight, forming a continuous plane, the edge is preferably wavy. In this context, wavy means that the edge is deflected upwardly, downwardly, or both with respect to the normal plane of the rotary blade. These deflections give the edge of the blade a wavy appearance. The waves may be regular or irregular, rounded or squared. In addition, a wavy rotary blade may have only some portion of the outer edge deformed with the remainder of the outer edge being straight and level.

Figure 4:
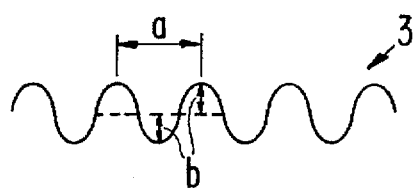
FIG. 4 shows a front view of a preferred rotary blade.

In one embodiment, the wavy edge has a substantially uniform and substantially sinusoidal pattern as is most clearly illustrated in FIG. 4. The waves of this type are constructed such that the wavy edge has a wave length, a, within the range of from ⅛ inch to 1 inch. Generally, the smaller the wave length, the more efficient the cutting and loosening action of the rotary blade.

The height of the sinusoidal pattern shown in FIG. 4 as distance b, is less than one-half the width of the crease of the horseshoe so that the total width of the wavy blade will not preclude its insertion into the crease of a horseshoe. In general, a horseshoe crease is no larger than ⅜th inch, although wider creases are known for use on some large and custom made shoes. Preferably then, the distance b is 1/32 to 3/16 inch, more preferably around 1/16 to ⅛ inch.

A wavy edge is advantageous over a straight edge rotary blade in that it more easily and quickly cuts and loosens the packed debris in the crease.

The farrier's tool of the present invention is useful in removing the debris that is packed into the crease of the horseshoe. Once the horseshoe has been removed from the horse's hoof and the nails removed from the crease, the tool is used by rolling, while applying pressure, the rotary blade over the crease portion of the shoe. The rotary blade cuts and loosens the packed debris in the crease. Once the debris is loosened, the brush portion of the tool is used to brush away the debris. Optionally, the shoe can also be brushed before the rotary blade is applied. This pre-brushing step can used to remove loose debris from the bottom the of shoe in general.

Having thus described the present invention, it will be obvious that the same may be varied in many ways. Such variations are not to be regarded as a departure from the spirit and scope of the invention and all such modifications as would be obvious to one skilled in the art are intended to be included within the scope of the following claims.

I claim:

1. A farrier's tool comprising:
   a handle extending in a longitudinal direction;
   a brush portion comprised of metal bristles disposed on the handle, said brush portion extending substantially in the longitudinal direction of the hands; and
   a rotary blade having an axis of rotation and adapted to fit into the crease on the bottom of a horseshoe, said axis of rotation being substantially perpendicular to the longitudinal direction of the handle.

2. The tool according to claim 1, wherein said brush portion is comprised of three rows of bristle collections.

3. The tool according to claim 2, wherein said bristles are made of steel wire.

4. The tool according to claim 2, wherein said brush portion is disposed on a major face of said handle and extends longitudinally along about ¼ to ¾ the length of said major face from a point near an edge of said major face toward an opposing edge of said major face.

5. The tool according to claim 4, wherein said handle is curved.

6. The tool according to claim 1, wherein said rotary blade has a substantially circular profile.

7. The tool according to claim 6, wherein said rotary blade has a wavy edge.

8. The tool according to claim 7, wherein said wavy edge has a substantially uniform and substantially sinusoidal pattern.

9. The tool according to claim 8, wherein said wavy edge has a wavelength in the range of from ⅛ inch to 1 inch.

10. The tool according to claim 9, wherein said wavy edge has a wave height within the range of from 1/32 to 3/16 inch.

11. The tool according to claim 6, wherein said rotary blade has a diameter in the range of from 1 to 4 inches.

12. The tool according to claim 11, wherein said rotary blade has a diameter of about 2 inches.

13. The tool according to claim 6, wherein said axis of rotation is disposed in an end of said handle.

14. A farrier's tool comprising:
    a handle extending in a longitudinal direction;
    a brush portion disposed on said handle; and
    a rotary blade having an axis of rotation adapted to fit into the cease on the bottom of a horseshoe and having a wavy edge, said axis of rotation being substantially perpendicular to the longitudinal direction of the handle.

15. A method for cleaning the crease of a horseshoe with a farrier's tool, which comprises:
    rolling a rotary blade attached to a handle of said farrier's tool over a debris containing crease portion of a horseshoe; and thereafter
    brushing said cease portion with a brush portion disposed on said handle of said farrier's tool to thereby remove said debris.

* * * * *